H. R. FULLER
Beef-Steak Tenderer.

No. 198,974.                    Patented Jan. 8, 1878.

Witnesses:                         Inventor:
C. Clarence Poole                  H. R. Fuller
R. K. Evans                        by A. H. Evans & Co.
                                        Attys

UNITED STATES PATENT OFFICE.

HARVEY R. FULLER, OF PRINCETON, MISSOURI.

IMPROVEMENT IN BEEFSTEAK-TENDERERS.

Specification forming part of Letters Patent No. 198,974, dated January 8, 1878; application filed October 27, 1876.

*To all whom it may concern:*

Be it known that I, HARVEY R. FULLER, of Princeton, in the county of Mercer and State of Missouri, have invented a Beefsteak-Tenderer; and I hereby declare the following to be a full, clear, and exact description thereof, reference being had to the accompanying drawings, making part of this specification, in which—

Figure 1:
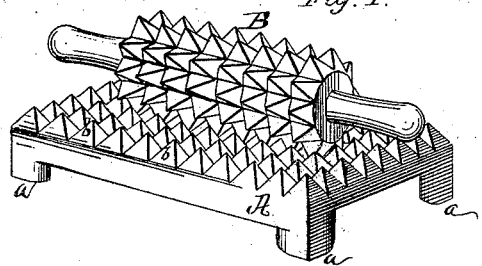
Figure 2:
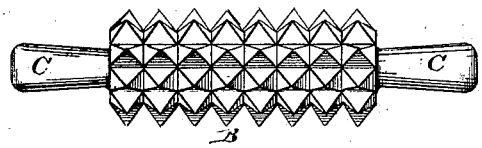
Figure 3:
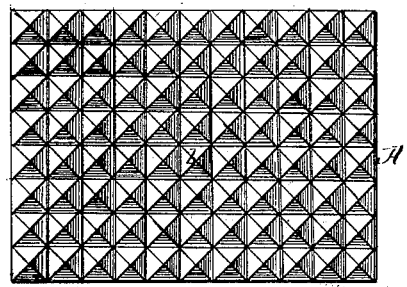
Figure 4:
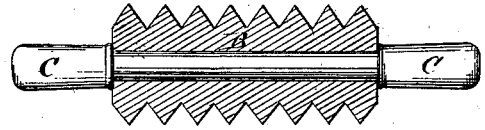

Figure 1 shows the roller and bed constituting my tenderer. Figs. 2 and 3 show the roller and stand separated. Fig. 4 is a sectional view of the roller.

The object of my invention is to provide a convenient beefsteak-tenderer by which the user can avoid the pounding or striking operation now so generally used.

My invention consists in a bed-plate provided with inequalities of surface and a roller having on its surface such inequalities as to mesh into those of the bed-plate.

In order that those skilled in the art may make and use my invention, I will proceed to describe the manner in which I have carried it out.

In the said drawings, A is a metallic table, provided, if desired, with feet *a a*. The upper surface of this table is formed of pyramidal projections *b b*, about three-eighths of an inch square at the base, and from seven-sixteenths to one-half of an inch high, more or less. The roller B has on its surface pyramidal projections the same size of, and to mesh into, those on the table A, and it is provided with handles C C.

Fig. 4 shows a modification of my roller, in which the handles C C are attached to each other by a rod running through the roller, and on which it turns freely.

The steak is laid on the table and the roller is run backward and forward over it until the points on roller and table break and crush the fiber until the meat becomes tender.

I am aware that two rollers have been provided with projections similar to mine, and arranged so as to pass the meat between them while revolving; but such an arrangement is objectionable, as it necessitates the removing of all bone from the meat before passing it between the rollers; and the purpose of my invention is to overcome this objection.

Having thus described my invention, what I claim as new, and desire to secure by Letters Patent, is—

A beefsteak-tenderer consisting of a metallic table, A, provided with pyramidal projections *a a*, in combination with the roller B, having corresponding pyramidal projections, as set forth.

HARVEY RUSSELL FULLER.

Witnesses:
D. M. KING,
W. W. BRISTOW.